Figure 1:
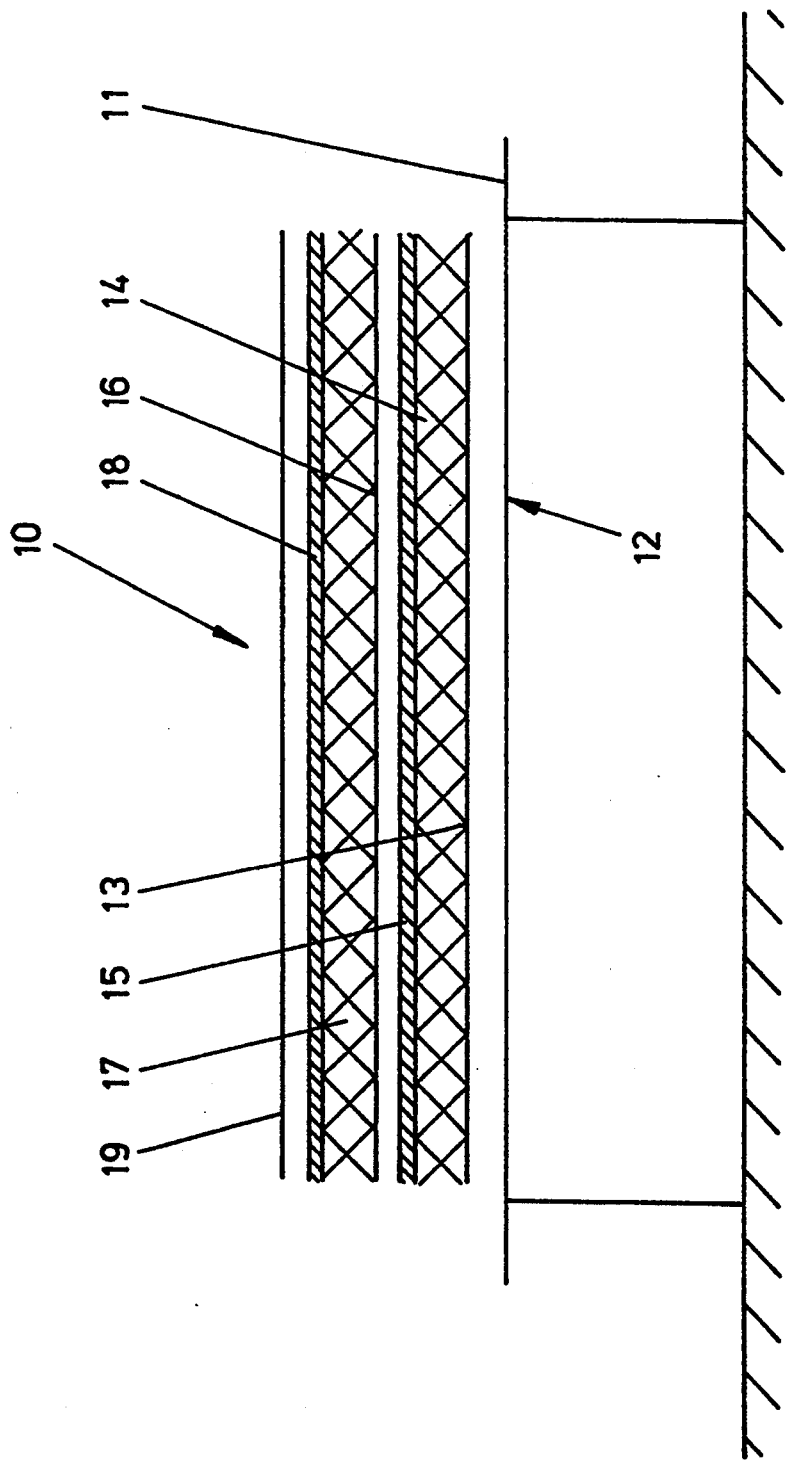

United States Patent [19]
Looi et al.

[11] Patent Number: 5,336,354
[45] Date of Patent: Aug. 9, 1994

[54] METHOD OF MANUFACTURING A LAMINATED PANEL

[76] Inventors: Hon Y. Looi; Phuay E. Teo, both of Block 5043, Ang Mo Kio Ind Park 2, No 01-531, Singapore, Singapore, 2056

[21] Appl. No.: 427,232

[22] Filed: Oct. 24, 1989

[51] Int. Cl.$^5$ .............................................. B32B 31/00
[52] U.S. Cl. ........................................ 156/277; 4/607; 4/609; 4/614; 52/785; 52/789; 156/278; 156/307.3; 428/203
[58] Field of Search ............ 156/277, 313, 278, 307.3; 4/607, 614, 609; 52/785, 789; 428/203

[56] References Cited

U.S. PATENT DOCUMENTS

| | | | |
|---|---|---|---|
| 1,947,516 | 2/1934 | Broadman | 156/280 |
| 2,980,574 | 4/1961 | Menzer | 428/203 |
| 3,198,686 | 8/1965 | Caligari | 428/203 |
| 4,219,598 | 8/1980 | Noma et al. | 428/203 |

FOREIGN PATENT DOCUMENTS

| | | |
|---|---|---|
| 890304 | 3/1962 | United Kingdom . |
| 988433 | 4/1965 | United Kingdom . |
| 1131718 | 10/1968 | United Kingdom . |

*Primary Examiner*—John J. Gallagher
*Attorney, Agent, or Firm*—Merchant & Gould, Smith Edell, Welter & Schmidt

[57] ABSTRACT

There is disclosed a transparent or translucent bath or shower panel, and a method of its manufacture, which comprises a laminate of two layers of resin-impregnated fibreglass which are transparent or translucent, and a non-woven tissue arranged between the fibreglass layers and provided with any desired decorative pattern which can be viewed through either one of the fibreglass layers, and yet which is protected from contact with water and water vapour by the fibreglass layers.

5 Claims, 1 Drawing Sheet

METHOD OF MANUFACTURING A LAMINATED PANEL

This invention relates to a panel for mounting along one or more edges of a bath or a shower tray, so as to form at least part of an enclosure for retaining water splashes generated in use of a bath or shower.

It is well known to use plastics sheets to form shower cabinets, one or more of such sheets forming access doors which are mounted for slidable movement along guide tracks between open and closed positions. Usually, these sheets are opaque, or translucent, and are often formed from a moulded sheet of clear plastics material, possibly incorporating a textured surface finish for decorative purposes, or to render the sheet non-transparent. However, if a decorative pattern should be required, this could only be provided by subsequent application of decorative cladding material e.g. in the form of "transfers" to the already moulded sheets, and this involves an additional manufacturing process, and also has the risk that the decorative cladding will deteriorate in service and eventually peel-off.

It is also known to mould plastics sheets to form "bath panels" which shield the bath sides from view, such sheets being moulded in a single colour to suit the colour of a particular bath.

Accordingly, to date, there has not been made available a technique whereby generally transparent or translucent panels can be produced readily on a mass production basis, and into which can be incorporated, during the manufacturing proceed, any selected decorative material.

According to one aspect of the invention there is provided a transparent or translucent panel for mounting along one or more edges of a bath or shower tray so as to form an at least partial enclosure for retaining water splashes generated in use of a bath or shower, in which the panel comprises a laminate of two layers of resin-impregnated fibreglass which are transparent or translucent, and a non-woven tissue arranged between said layers.

The tissue may be provided with any desired decorative pattern, which is thereby imparted to the entire panel and which can be viewed from either side of the panel through a corresponding one of the two fibreglass layers.

By virtue of the incorporation of the decorative material within the body of the panel during its manufacture, the decorative material is excluded from contact with water and water vapour, and therefore the visual presentation of the decorative material is not affected adversely in service.

The required pattern or decorative material may conveniently be formed on the tissue by silk screen printing, which enables accurate designs to be applied on a mass production basis, and which designs are entirely shielded from the damaging environment in which the panels will be used, namely the repeated cycle of exposure to water and vapour and subsequent air drying.

To provide a smooth external finish to the panel, it is preferred that a surface film be applied to the exposed face of each fibreglass layer.

According to another aspect of the invention there is provided a method of making a transparent or translucent panel for mounting along one or more edges of a bath or shower tray so as to form an at least partial enclosure for retaining water splashes generated in use of a bath or shower, in which the method comprises the steps of:

laying a first layer of fibreglass mat on a support surface;

applying a resin to the exposed surface of the fibreglass mat which permeates the fibreglass layer, the fibreglass mat and the resin being of such a composition as to provide a transparent or translucent composite sheet when set;

applying a non-woven tissue to the exposed face of the resin-impregnated fibreglass mat;

applying a second fibreglass mat to the exposed face of the non-woven tissue;

applying a resin to the exposed face of the second fibreglass mat so as to impregnate the mat; and allowing or causing the resin impregnated fibreglass mate to set or cure, so as to form a laminate composed of two layers of resin impregnated fibreglass which are transparent or translucent, with the non-woven tissue arranged therebetween.

Preferably, a decorative pattern is applied to the non-woven tissue prior to arrangement in the laminate, the pattern being formed preferably by a silk screen printing operation.

To enable a smooth finish to be obtained on each face of the laminate, it is preferred that a first transparent plastics film be applied to the support surface prior to the application of the first fibreglass mat, and a second transparent, plastics film is applied to the exposed face of the second resin-impregnated fibreglass mat. The two transparent plastics films provide a very smooth surface finish, which promotes ready shedding of water impinging on the surface of the panel.

A transparent or translucent panel according to the invention, and a method of manufacture thereof, will now be described in detail with reference to the accompanying schematic drawing.

Referring now to the drawing, there will now be described a transparent or translucent panel for mounting along one or more edges of a bath or shower tray so as to form an at least partial enclosure for retaining water splashes generated in use of a bath or shower, and a method of manufacturing such a panel. The panel is designated generally by reference 10 and comprises a series of successive layers which are applied in turn to a support surface 11 formed by a flat horizontal table 12 having dimensions of at least 1.5 meter by 3 meter.

The laminate includes essentially two layers of resin-impregnated fibreglass which are transparent or translucent, and a non-woven tissue arrangement between these layers. However, in addition, it is preferred that a smooth surface finish is provided for the exposed faces of the resin impregnated layers, by applying transparent plastics films.

Thus, as shown in the drawing, a first transparent plastics film 13 is laid on the table 12, and takes the form of a polyethylene terephthalate film 16 microns thick. The table 12 is provided with a glass top, and the film 13 is smoothed onto the table top by a scraper tool.

Onto the exposed face of the film 13 there is applied a first layer of chopped fibreglass mat 14 of 300 grams size. A resin 15 is then applied to the exposed face of the fibreglass mat 14, and this impregnates the fibreglass mat. The resin 15 comprises a mixture of saturated polyester resin (weighing 2.8 kilograms) and 50 grams methyl ethyl ketone peroxide. A nylon roller is then applied to the layer structure thus formed by film 13, fibreglass layer 14 and resin 15 so as to flatten these components. A further brush roller may then be used which is applied to the structure thus formed, to ensure that any air bubbles present in the structure are expelled.

A sheet of non-woven tissue 16 is then applied, to which any required decorative material has been pre-applied by a silk screen process. The non-woven tissue preferably comprises a non-woven tissue of the type available under the trade mark EDEROL-FILTER NON-WOVEN. The process of flattening and smoothing is then repeated.

Thereafter, a second layer of chopped fibreglass mat 17 is applied, and resin 18 is applied, similarly to resin 15, and finally a second transparent plastics film 19 is applied. It should be noted that, after each layer of either resin, or sheet material (chopped mat, the non-woven tissue or the films) is laid, it is smoothened. Also, a light film of water is sprayed over the second film 19, so that the scraper can move smoothly over the composite structure.

Prior to setting or curing of the composite structure, the structure is stretched over the surface of the table 12, and is then retained by clips. The composite structure then cures or sets naturally in about 2 hours, though alternative resin components may be used, in which some other means than air drying is used to cause the composite structure to cure or set. After about 2 to 3 hours, the composite structure has dried, and forms a rigid laminate approximately 2 mm thick, which can then be used to form a shower enclosure following mounting on the edges of a shower tray, or an enclosure along the upper edge of a bath.

Therefore, the method described above provides a transparent or translucent panel in the form of a laminate composed of two layers of resin impregnated fibreglass which are transparent or translucent, and with a non-woven tissue arranged between these layers and which is provided with any required decorative material for the panel. By incorporating the decorative material within the body of the laminate, it is shielded form exposure to any agents which otherwise would be liable to cause deterioration in the appearance of the decorative material.

We claim:

1. A method of making a transparent or translucent panel for mounting along one or more edges of a bath or shower tray so as to form an at least partial enclosure for retaining water splashes generated in use of a bath or shower, in which the method comprises the steps of:
    laying a first, thin, transparent film on a support surface;
    laying a first layer of fiberglass mat on said transparent film;
    applying a resin to the exposed surface of the fiberglass mat which permeates the fiberglass layer, the fiberglass mat and the resin being of such a composition as to provide a transparent or translucent composite sheet when set;
    applying a non-woven tissue to the exposed face of the resin-impregnated fiberglass mat;
    applying a second fiberglass mat to the exposed face of the non-woven tissue;
    applying a resin to the exposed face of the second fiberglass mat so as to impregnate the mat;
    applying a second, thin, transparent film to said resin-impregnated second fiberglass mat; and
    allowing or causing the resin impregnated fiberglass mats to set or cure, so as to form a laminate composed of two layers of resin impregnated fiberglass which are transparent or translucent, with the non-woven tissue arranged therebetween.

2. A method according to claim 1 in which a decorative pattern is applied to the non-woven tissue prior to arrangement in the laminate.

3. A method according to claim 2 in which the pattern is formed by a silk screen printing operation.

4. A method according to claim 1 in which the transparent film is a polyester film 5. A method according to claim 1 in which the transparent film is a polyethylene terephthalate film.

* * * * *